United States Patent
Oberndorfer et al.

(10) Patent No.: US 9,636,767 B2
(45) Date of Patent: May 2, 2017

(54) PLUG PART AND SOCKET PART FOR DETACHABLY CONNECTING A TUBE ELBOW OF A GAS-COOLED WELDING TORCH TO A HOSE PACKET, AND CONNECTING DEVICE WITH SUCH A PLUG PART AND SOCKET PART

(71) Applicant: Fronius International GmbH, Pettenbach (AT)

(72) Inventors: Klaus Oberndorfer, Vorchdorf (AT); Daniel Platzer, Wels (AT); Wolfgang Attwenger, Neukirchen (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 14/388,893

(22) PCT Filed: Mar. 6, 2013

(86) PCT No.: PCT/AT2013/050056
§ 371 (c)(1),
(2) Date: Sep. 29, 2014

(87) PCT Pub. No.: WO2013/142887
PCT Pub. Date: Oct. 3, 2013

(65) Prior Publication Data
US 2015/0306695 A1    Oct. 29, 2015

(30) Foreign Application Priority Data
Mar. 30, 2012 (AT) .................................. 50114/2012

(51) Int. Cl.
*B23K 9/32* (2006.01)
*B23K 9/29* (2006.01)

(52) U.S. Cl.
CPC .............. *B23K 9/323* (2013.01); *B23K 9/295* (2013.01)

(58) Field of Classification Search
CPC ....................................................... B23K 9/293
(Continued)

(56) References Cited

U.S. PATENT DOCUMENTS 4,270,824 A * 6/1981 Erickson ................ B23K 9/323
219/137.63
4,549,068 A * 10/1985 Kensrue ................ B23K 9/323
219/137.31
(Continued)

FOREIGN PATENT DOCUMENTS

CN    2624052 Y    7/2004
DE    21 46 404 A1    8/1973
(Continued)

OTHER PUBLICATIONS

International Search Report of PCT/AT2013/050056, mailed Nov. 4, 2013.
(Continued)

*Primary Examiner* — Thien S Tran
(74) *Attorney, Agent, or Firm* — Collard & Roe, P.C.

(57) ABSTRACT

A plug part for detachably connecting a torch neck of a gas-cooled welding torch to a socket part disposed on a hose package includes a cylindrical pipe element with a flange and with an axially extending channel for a welding wire and for a protective gas and includes a union nut which is rotatably disposed on the pipe element and which includes an inner thread for connection to a corresponding outer thread on the socket part. To produce an optimal connection between the torch neck and the hose package, a bevel is disposed on the flange of the pipe element of the plug part, and the end piece of the socket part has at least one axial slot.

11 Claims, 5 Drawing Sheets

(58) Field of Classification Search
USPC ... 219/121.48, 121.5, 137.31, 137.48, 137.5, 219/137.63
See application file for complete search history.

(56) References Cited

U.S. PATENT DOCUMENTS

| | | | | |
|---|---|---|---|---|
| 4,842,815 A | * | 6/1989 | Cauquelin | F16B 21/04 285/360 |
| 5,384,447 A | * | 1/1995 | Raloff | B23K 9/323 219/137.31 |
| 5,798,493 A | * | 8/1998 | Heller, Sr. | B23K 9/32 219/124.02 |
| 5,841,105 A | * | 11/1998 | Haczynski | B23K 9/295 219/124.02 |
| 6,720,528 B1 | * | 4/2004 | Matiash | B23K 9/323 219/137.31 |
| 7,987,889 B1 | * | 8/2011 | Story | B60C 25/0545 157/14 |
| 2004/0074887 A1 | | 4/2004 | Matiash et al. | |
| 2007/0284353 A1 | * | 12/2007 | Laymon | B23K 9/293 219/137.31 |

FOREIGN PATENT DOCUMENTS

| | | |
|---|---|---|
| DE | 2 243 924 A1 | 3/1974 |
| DE | 24 29 882 A1 | 1/1976 |
| DE | 92 16 866 U1 | 2/1993 |
| DE | 195 13 458 A1 | 10/1996 |
| WO | 2007/146878 A2 | 12/2007 |
| WO | 2011/014900 A1 | 2/2011 |

OTHER PUBLICATIONS

Austrian Preliminary Office Action dated Nov. 22, 2012 in Austrian Application No. A 50114/2012 with English translation of the relevant parts.
Chinese Office Action in CN 201380017779.1, dated Jan. 6, 2016, with English translation.

* cited by examiner

PLUG PART AND SOCKET PART FOR DETACHABLY CONNECTING A TUBE ELBOW OF A GAS-COOLED WELDING TORCH TO A HOSE PACKET, AND CONNECTING DEVICE WITH SUCH A PLUG PART AND SOCKET PART

CROSS REFERENCE TO RELATED APPLICATIONS

This application is the National Stage of PCT/AT2013/050056 filed on Mar. 6, 2013, which claims priority under 35 U.S.C. §119 of Austrian Application No. A 50114/2012 filed on Mar. 30, 2012, the disclosures of which are incorporated by reference. The international application under PCT article 21(2) was not published in English.

BACKGROUND OF THE INVENTION

1. Field of the Invention

The invention relates to a plug part for detachably connecting a torch neck of a gas-cooled welding torch to a socket part arranged on a hose package if need be by interconnecting a torch housing, having a cylindrical pipe element with a flange and an axially extending channel for a welding wire and a protective gas, and a union nut rotatably arranged on the pipe element, said union nut having an inner thread for connection to a corresponding outer thread on the socket part.

Furthermore, the invention relates to a socket part for detachably connecting a hose package to a plug part arranged on a torch neck of a gas-cooled welding torch, having an at least partially cylindrically formed end piece with an axially extending channel for a welding wire and a protective gas, and an outer thread for connection to a corresponding inner thread of a union nut of the plug part.

Finally, the invention relates to a connecting device for detachably connecting a torch neck of a gas-cooled welding torch to a hose package, wherein the torch neck comprises an above-mentioned plug part and the hose package comprises an above-mentioned socket part.

2. Description of the Related Art

Torch necks for welding torches of the relevant kind have, for instance, become known from WO 2011/014900 A1 or from DE 9216866 U1.

Usually, torch necks are detachably connected to the hose package or the torch housing and/or torch handle of a welding torch. This renders it possible for the welder to choose among torch necks of different design and to use the most suited one for performing the respective welding process, on the one hand, and to exchange the torch neck once it is damaged or contaminated, on the other hand. Usual connections between the torch neck and the hose package or torch housing are performed with appropriate threads or quick fasteners such as, for instance, bayonet fasteners. In addition to the necessary mechanical stability of the connection between the torch neck and the hose package and/or the torch handle or torch housing, the connection is also intended to ensure that substantially no protective gas will exit due to leakage. Since electrical energy is also transmitted via the connecting device, i.e. the plug part and the socket part, the connecting device is also intended to guarantee the appropriate electrical conduction. It is of advantage for welding if the torch neck is configured to be rotated at least within a certain range, so that the welding torch may always be held at an optimal angle to the welding seam intended.

The well-known connecting devices between the torch neck and the hose package and/or the torch housing of a welding torch frequently only meet with a part of the demands mentioned and are complex to handle.

SUMMARY OF THE INVENTION

It is therefore an object of the present invention to provide a plug part and a socket part of a connecting device for detachably connecting a torch neck of a gas-cooled welding torch to a hose package by means of which it is possible to meet with the above-mentioned demands. The plug part and the socket part of such a connecting device are intended to be produced in a preferably simple and cost-efficient manner. Moreover, at least one angular position and/or reference position of the torch neck relative to the hose package or torch housing is intended to be set easily.

The object according to the invention is solved by an above-mentioned plug part, wherein a bevel is disposed on the flange of the pipe element. The bevel on the flange of the pipe element of the plug part achieves an optimum current transfer between the plug part and the associated socket part. By means of the union nut rotatably arranged on the pipe element the plug part is pressed optimally against the associated socket part and an optimal mechanical and electrical connection is produced. Such a bevel on the flange of the pipe element is particularly simple and cost-efficient to manufacture.

If at least one receiving opening for receiving a pin-like element of the socket part in order to fix at least one angular position of the torch neck is arranged on the flange of the pipe element, it is possible to generate sort of a reference position in at least one angular position of the torch neck. Starting out from this at least one reference position, the welder may move the torch neck to another desired angular position if required.

If a plurality of receiving openings are provided for a pin-like element of the socket part, a plurality of reference positions may be set at particular angular distances which the welder may choose depending on the welding process. An appropriate marking on the plug part and, if need be, on the socket part, for instance, with appropriate notches or coloured markings, may be a simplification measure in this respect.

The object according to the invention is also solved by an above-mentioned plug part, wherein at least one receiving opening for receiving a pin-like element of the socket part is arranged on the flange of the pipe element in order to fix at least one angular position of the torch neck. With respect to the advantages that may be achieved thereby, reference is made to the above paragraph.

The receiving opening is preferably formed by a bore. A bore that need not necessarily be a through bore, but may, for instance, be configured as a blind bore, is particularly simple and quick to produce.

If the union nut projects over the end of the pipe element and an abutment element is provided for preventing an axial shifting of the union nut beyond the end of the pipe element, the tube element may be protected from damage or deformation.

In accordance with a further feature of the invention, at least one sealing ring is arranged at the pipe element. Such a sealing ring which may be formed of a suitable elastic material such as, for instance, silicone, prevents protective gas from exiting from the axially extending channel in the region of the connection between the plug part and the socket part.

A sliding ring of electrically conductive material may be arranged between the union nut and the flange of the pipe element. Such a sliding ring of electrically conductive material makes it possible to easily modify the angular position of the torch neck relative to the torch handle or the hose package without having to open the union nut completely. The electrically conductive material ensures that free power transmission from the hose package to the torch neck and subsequently to the contact nozzle is ensured.

The union nut has a diameter preferably decreasing toward the free end of the torch neck and may in particular have a frustoconical shape. Such a design facilitates the handling of the union nut and prevents and/or reduces corresponding edges between the union nut and the torch neck.

The union nut may have a plastic sheath. Such a plastic sheath of suitable material and in appropriate design, for instance, with axial grooves, also facilitates handling and produces both an electrical and a thermal insulation to the plug part of the welding torch positioned there below.

The object according to the invention is also solved by an above-mentioned socket part, wherein the end piece comprises at least one axial slot. By means of the arrangement of at least one such axial slot it is possible to produce an optimal connection in the form of spreading pliers or tongs. By tightening the union nut of the associated plug part, the resulting jaws of the end piece of the socket part are pressed appropriately against the cylindrical pipe element of the plug part and cause a tight and optimally conducting connection between the socket part and the plug part. A socket part of this design is particularly quick and cost-efficient to produce.

It is of advantage if a pin-like element resiliently mounted in the direction of the plug part to be connected is provided, said pin-like element being receivable in at least one receiving opening in the plug part in order to fix at least one angular position of the torch neck. This makes it possible to produce a kind of snap connection between the plug part and the socket part in the at least one predetermined angular position or reference position. If, as described above, a plurality of receiving openings are arranged in the plug part at different angular positions, the pin-like element may snap in these different angular positions on the socket part so that particular positions of the torch neck may be marked.

The object according to the invention is also solved by an above-mentioned socket part, wherein a pin-like element resiliently mounted in the direction of the plug part to be connected is provided, said pin-like element being receivable in at least one receiving opening in the plug part in order to fix at least one angular position of the torch neck. This makes it possible for the welder to assume in a very easy manner at least one reference position of the torch neck with respect to the hose package and/or the torch housing. With respect to the advantages that can be achieved thereby, reference is made to the above paragraph.

The pin-like element preferably has a substantially hemispherical end. Such a design of the end of the pin-like element renders it possible for the pin-like element to be displaced easily when the torch neck is twisted relative to the socket part and another position may be assumed with the torch neck.

A bevel corresponding to a bevel on the flange of a cylindrical pipe element of the plug part to be connected may be arranged on the end piece. Such a bevel increases the contact face to the associated plug part and hence improves the electrical transfer.

It is of particular advantage if the end piece of the socket part comprises two cross-wise slots. This produces a kind of spreading pliers or tongs with four movable jaws which are pressed together by the union nut of the associated plug part. The result is an optimal connection of the plug part with the socket part and an optimal electrical contact of the electrically conductive components.

The object according to the invention is also solved by a connecting device for detachably connecting a torch neck of a gas-cooled welding torch to a hose package, wherein the torch neck comprises a plug part with the above-mentioned features and the hose package comprises a socket part with the above-mentioned features. With respect to the advantages that can be achieved thereby, reference is made to the above description of the plug part and of the socket part.

The plug part is connected to the torch neck, preferably soldered. Such a connection is particularly quick and simple to perform. Alternatively, the connection may also be performed by pressing or gluing with appropriate glues.

The socket part is connected to the end of a hose package if need be by interconnecting a torch housing. The connection of the socket part to the end of the hose package or the torch housing may also be performed in different manners, particularly by gluing.

If the torch neck is adapted to be rotated by 360° relative to the hose package, wherein at least one angular position of the torch neck is fixed by the at least one receiving opening in the plug part and the pin-like element in the socket part, particular flexibility for all welding processes may be achieved.

In order to prevent that a torch neck of a gas-cooled welding torch can be connected with the socket part to the torch housing or the hose package for a water-cooled welding torch, the dimensions of the plug parts and of the socket parts of gas-cooled welding torches and of water-cooled welding torches are preferably of different design. Such a different design may, for instance, be achieved by different diameters of the union nut and the like.

BRIEF DESCRIPTION OF THE DRAWINGS

The present invention will be explained in detail by means of the enclosed schematic drawings. There show.

DETAILED DESCRIPTION OF THE PREFERRED EMBODIMENTS

Figure 1:
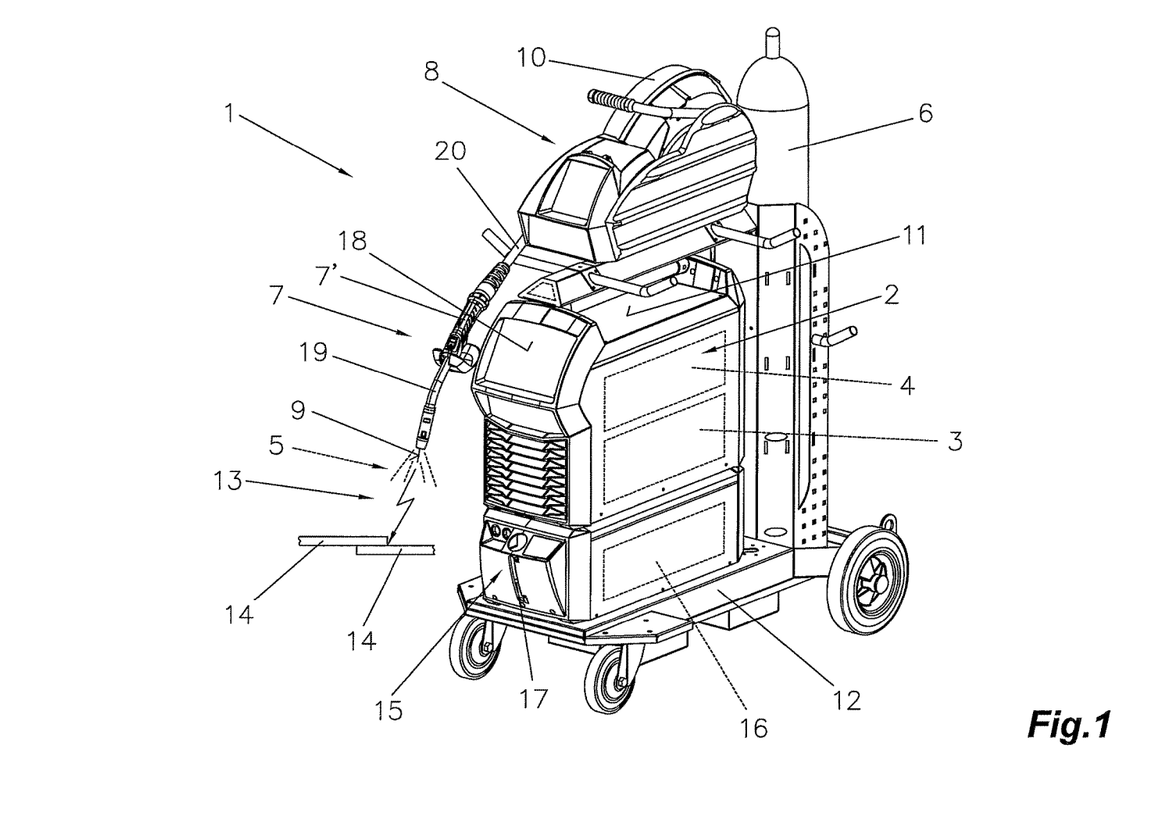
FIG. 1 a schematic illustration of a welding device.

FIG. 1 illustrates a welding device 1 for a wide variety of processes and/or methods, such as e.g. MIG/MAG, WIG/TIG, electrode, twin wire/tandem welding method, plasma or solder method, etc.

The welding device 1 comprises a current source 2 with a power unit 3 arranged therein, a control device 4 and further components and lines that are not illustrated, such as, for instance, a switching element, control valves, etc. The control device 4 is, for instance, connected to a control valve which is arranged in a supply line for a protective gas 5, for example $CO_2$, helium or argon and the like, between a gas tank 6 and a welding torch 7.

Moreover, a device 8 for supplying a welding wire 9 from a reservoir drum 10 and/or a wire roll to the region of the welding torch 7 may be controlled via the control device 4, as is, for instance, usual for MIG/MAG welding. It is to be understood that the supply device 8 may also be integrated in the welding device 1, in particular in the housing 11 of the current source 2 and not, as illustrated in FIG. 1, be positioned as an additional device on a carriage 12. The supply device 8 for the welding wire 9 may also be mounted directly on the welding device 1, wherein the housing 11 of the current source 2 is designed on the top for receiving the supply device 8 and the carriage 12 may be omitted.

The welding wire 9 may be supplied by a supply device 8 also externally of the welding torch 7 to the process site, wherein a non-fusing electrode is preferably arranged in the welding torch 7, as is usual with WIG/TIG welding.

The current for forming an arc 13, in particular an operating arc, between the electrode and/or the welding wire 9 and a work piece 14 formed of one or several parts is supplied via a welding line (not illustrated) from the power unit 3 of the current source 2 to the welding torch 7, in particular the electrode and/or the welding wire 9. The work piece 14 to be welded is connected with the current source 2 via a further welding line (not illustrated) for the further potential, in particular a ground cable, so that a circuit for a process may be established through the arc 13 and/or a plasma jet formed. When using a torch with an internal arc 13, as may be the case with a plasma torch, the two welding lines are guided to the torch, so that an appropriate circuit may be established in the torch (not illustrated).

For cooling the welding torch 7, it is connected via a cooling device 15, interconnecting possible components such as, for instance, a flow controller, to a fluid container, in particular a water container 16 with a filling level indicator 17. On start-up of the welding torch 7 the cooling device 15, in particular a fluid pump used for the fluid contained in the water container 16, is started, so that cooling of the welding torch 7 is effected. As shown in the illustrated embodiment, the cooling device 15 is positioned on the carriage 12, and subsequently the current source 2 is placed thereon. The individual components of the welding device 1, i.e. the current source 2, the wire supply device 8, and the cooling device 15, are designed such that they have appropriate projections and/or recesses, so that they can be stacked or placed upon each other safely.

The welding device 1, in particular the current source 2, further comprises an input and/or output device 18 by which a wide variety of welding parameters, operating modes or welding programs of the welding device 1 may be set and/or selected and displayed. The welding parameters, operating modes or welding programs set by the input and/or output device 18 are transmitted to the control device 4 which subsequently triggers the individual components of the welding device 1 and/or predetermines appropriate nominal values for regulation or control.

In the illustrated embodiment the welding torch 7, comprising a torch neck 19 and if need be a torch housing 7', is connected to the welding device 1 via a hose package 20. The individual lines, such as, for instance, the supply line, lines for the welding wire 9, the protective gas 5, the cooling circuit, the data transmission, etc., from the welding device 1 to the welding torch 7 are arranged in the hose package 20, whereas the ground cable is preferably connected separately to the current source 2. The hose package 20 is preferably connected to the current source 2 or the supply device 8 via a coupling device that is not illustrated, whereas the individual lines in the hose package 20 are fastened to or in the welding torch 7. In order that an appropriate strain relief of the hose package 20 is ensured, the hose package 20 may be connected to the housing 11 of the current source 2 or the supply device 8 via a strain relief device (not illustrated). In order to enable an exchange of the torch neck 19 of the welding torch 7, it is connected via an appropriate connecting device to the hose package 20 or a torch housing 7' which is fastened to the hose package 20. The connecting device comprises a plug part 21 connected to the torch neck 19 of the welding torch 7 and a socket part 34 connected to the hose package 20 or a torch housing 7' connected to the hose package 20, which will be explained in detail by means of FIGS. 2 to 7.

Basically, it is not necessary to use and/or employ all the afore-mentioned components for the different welding methods and/or welding devices 1 such as, for instance, WIG devices, MIG/MAG devices or plasma devices. If the welding torch 7 is designed as a gas-cooled welding torch 7, the cooling device 15 may also be omitted. The welding device 1 is formed at least by the current source 2, the supply device 8 and if need be the cooling device 15, wherein these components may also be arranged in a joint housing 11. Further parts or components such as, for instance, a device for protection from rubbing on the wire supply device 8 or an option carrier on a holding device for the gas tank 6, etc. may be arranged.

The embodiment of a welding device 1 illustrated in FIG. 1 constitutes just one of many possibilities. The welding devices 1 may vary in particular with respect to the supplying of the welding wire 9, the length of the hose package 20, the kind, position and number of supply devices 8 for the welding wire 9, the existence of a wire buffer (not illustrated) and much more.

Figure 2:
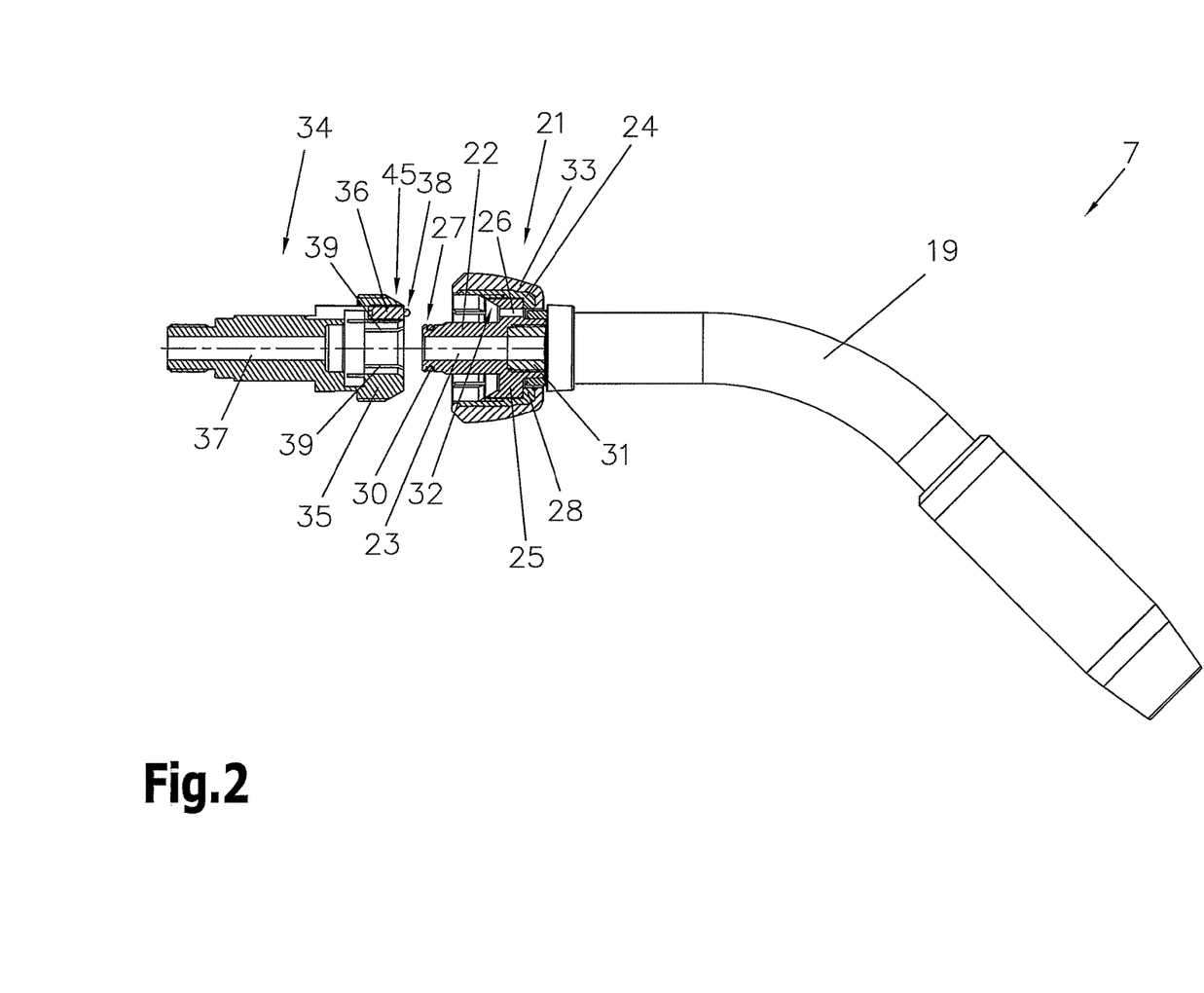
FIG. 2 a torch neck with a plug part and an associated socket part in a disconnected condition in a partially sectional view.

FIG. 2 illustrates a torch neck 19 with a plug part 21 and an associated socket part 34 in a disconnected condition in a partially sectional view. The plug part 21 is connected to the torch neck 19 of the welding torch 7, preferably soldered. The plug part 21 comprises a cylindrical pipe element 22 with an axially extending channel 23 for a welding wire 9 and a protective gas 5 (not illustrated). A union nut 24 is arranged rotatably on the cylindrical pipe element 22 of the plug part 21, said union nut 24 comprising an inner thread adapted to be screwed on a corresponding outer thread on an at least partially cylindrical end piece 35 of the associated socket part 34. In order to protect the end 27 of the pipe element 22 from deformation, it is of advantage if the union nut 24 projects over the end 27 of the pipe element 22 and if an abutment element 28 is provided which prevents an axial shifting of the union nut 24 beyond the end 27 of the pipe element 22. This possibility is not implemented with the embodiment illustrated. The plug part 21 comprises a flange 25 on which a bevel 32 is arranged which, when the plug part 21 is connected with the associated socket part 34, coincides with a bevel 45 on the socket part 34 which has an appropriately corresponding design. The bevel 32 on the plug part 21 and the bevel 45 on the socket part 34 ensure an optimal electrical contact. At least one receiving opening 26 may be provided on the flange 25 of the plug part 21 in which an appropriately designed pin-like element 36 of the socket part 34 may be received. The mating of the positions of the pin-like element 36 of the socket part 34 and the receiving opening 26 on the plug part 21 fixes a particular angular position of the torch neck 19. If a plurality of receiving openings 26 are arranged, a plurality of angular positions of the torch neck 19 may be fixed. The receiving opening 26 is, in the simplest case, formed by a bore. In order to prevent protective gas which is guided through the axially extending channel 23 of the plug part 21 from exiting in the region of the connection, a sealing ring 30 may be arranged at the pipe element 22.

A sliding ring 31 of electrically conductive material may be arranged between the union nut 24 and the flange 25 of the pipe element 22. This sliding ring 31 facilitates the twisting of the torch neck 19 when the union nut 24 is loosened.

The union nut 24 may have a diameter decreasing in the direction of the free end of the torch neck 19 in the region of the contact nozzle and may substantially be of frusto-conical shape. This facilitates handling and prevents the existence of too large steps between the union nut 24 and the torch neck 19. Preferably, the union nut 24 has a plastic sheath 33 producing a thermal and electrical insulation.

The socket part 34 associated with the plug part 21 has an at least partially cylindrical end piece 35 and an axially extending channel 37 for the welding wire 9 and the gas 5 (not illustrated). An outer thread for connection to a corresponding inner thread of the union nut 24 of the plug part 21 is arranged on the end piece 35. In accordance with the invention, the end piece 35 comprises at least one axial slot 39, preferably two cross-wise axial slots 39 (see FIG. 6). Thus, a kind of spreading pliers or tongs is formed in that the socket part 34 and/or the end piece 35 thereof is separated into four jaws which are pressed against the cylindrical pipe element 22 of the plug part 21 when the union nut 24 of the plug part 21 is tightened. The result is a correspondingly good electrical and mechanical connection and an optimal tightness of the channels 23, 37 of the plug part 21 and/or the socket part 34. A resiliently mounted pin-like element 36 may be positioned at the front side of the end piece 35 of the socket part 34, said pin-like element 36 being adapted to project into at least one receiving opening 26 in the plug part 21 in order to fix at least one angular position and/or reference position of the torch neck 19. The pin-like element 36 preferably comprises a substantially hemispherical end 38, so that it can easily be deflected from the receiving opening 26 when the torch neck 19 is twisted.

The illustrated socket part 34 of the connecting device is connected with a hose package 20 (not illustrated) or a torch housing 7' or torch handle of the welding torch 7. For this purpose, an appropriate connecting element 40, for instance, a screw connection, is provided on the socket part 34.

In order to be able to offer optimal flexibility to the welder, the torch neck 19 of the welding torch 7 is adapted to be twisted preferably by 360°. For the purpose of twisting the union nut 24 is slightly loosened, so that the possible pin-like element 36 may be deflected from the receiving opening 26 and be twisted to the desired position. Then, the union nut 24 is tightened again, so that an optimal connection between the plug part 21 and the socket part 34 is created.

Figure 3:
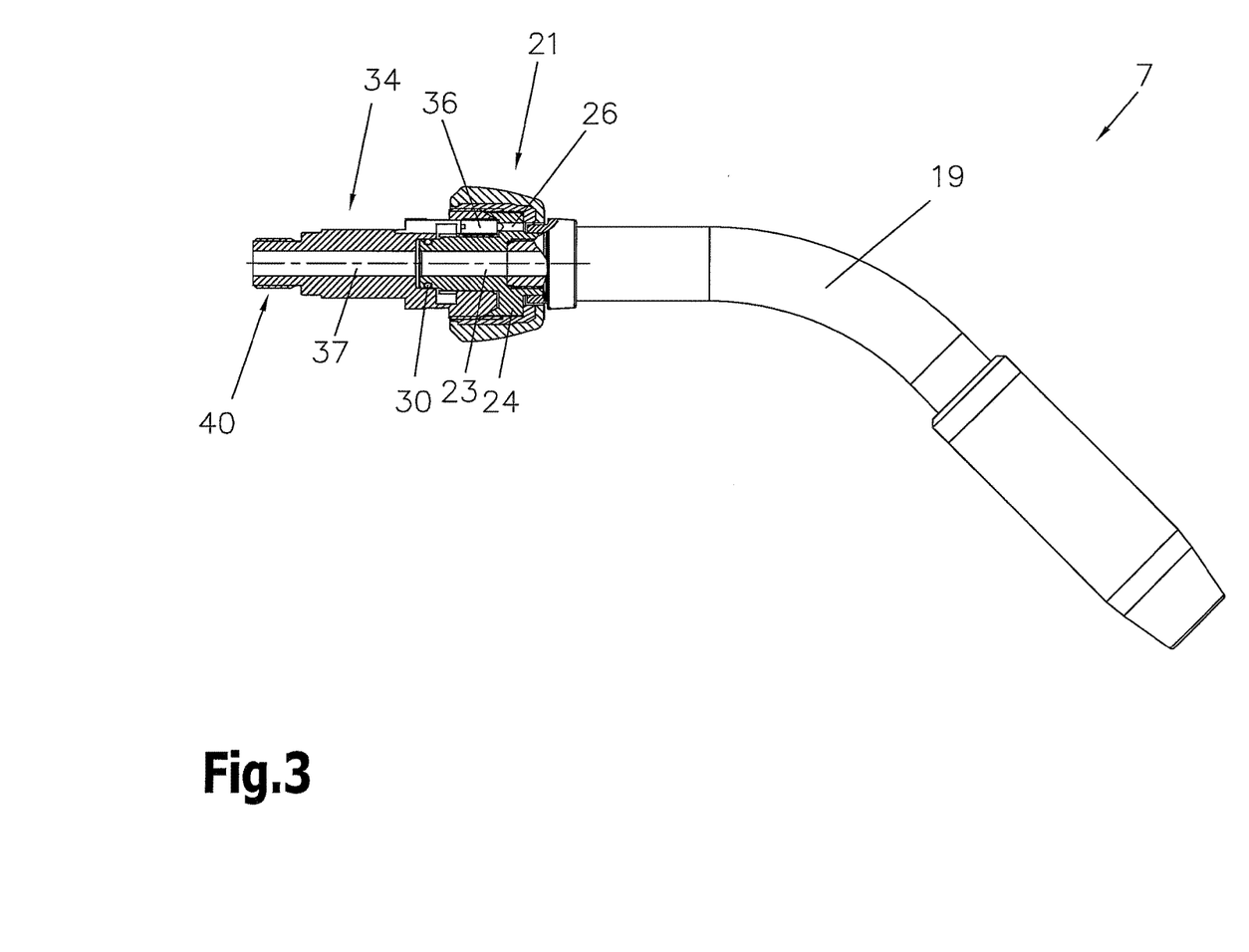
FIG. 3 the torch neck with the plug part and the socket part according to FIG. 2 in the connected condition in a partially sectional view.

FIG. 3 illustrates the torch neck 19 with the plug part 21 and the socket part 34 according to FIG. 2 in a connected condition and partially sectioned. In the illustrated position the torch neck 19 is in the fixed angular position and/or reference position in which the pin-like element 36 projects into the receiving opening 26.

Figure 4:
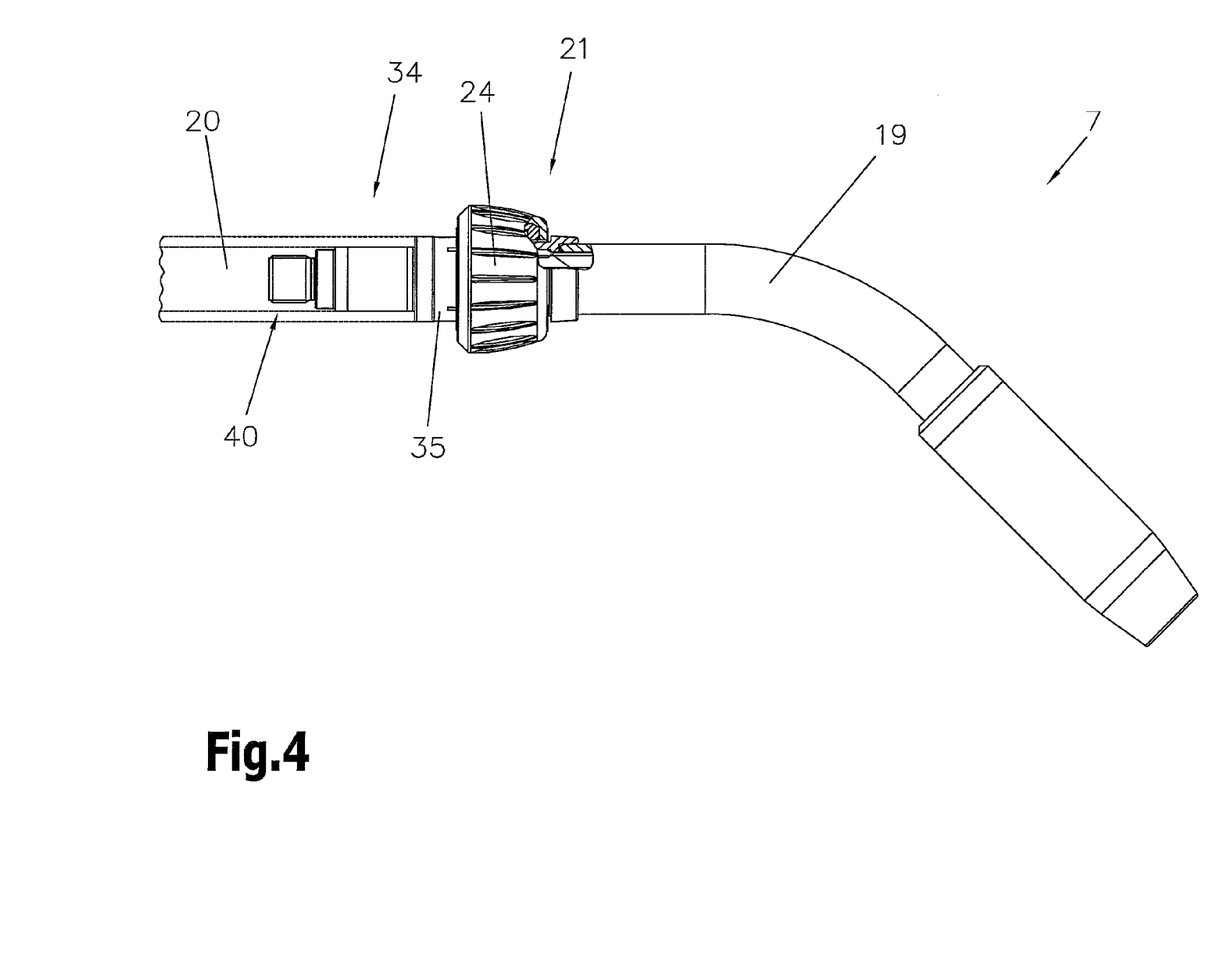
FIG. 4 the torch neck with the plug part and the socket part according to FIG. 2 in the connected condition in a partially sectional view.

FIG. 4 illustrates the torch neck 19 with the plug part 21 and the socket part 34 according to FIG. 2 in the connected condition and in a partially sectional view. In this illustration a hose package 20 connected with the socket part 34 is indicated. The union nut 24 or its plastic sheath 33, respectively, may be provided with axially extending grooves or the like so as to facilitate handling of the union nut 24.

Figure 5:
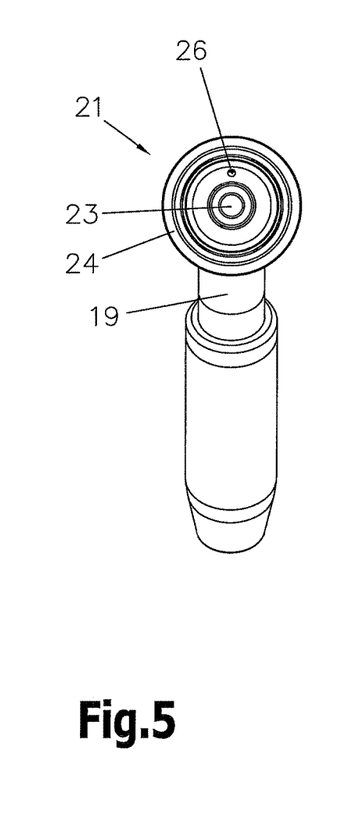
FIG. 5 a front view of the plug part connected to the torch neck according to FIGS. 2 to 4.

From the front view of the plug part 21 connected to the torch neck 19 according to FIG. 5, the possible receiving opening 26 on the plug part 21 can be recognized. As already mentioned, a plurality of receiving openings 26 may also be arranged on the plug part 21 so as to create a plurality of reference positions for the torch neck 19.

Figure 6:
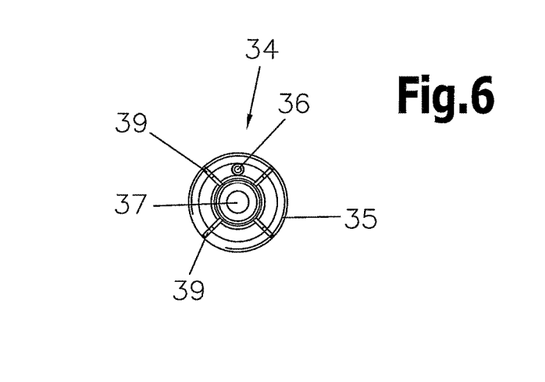
FIG. 6 a front view of the socket part according to FIGS. 2 to 4.

FIG. 6 illustrates a front view of the socket part 34 according to FIGS. 2 to 4 from which the slots 39 in accordance with the invention in the end piece 35 of the socket part 34 can be recognized. The resiliently mounted pin-like element 36 that may be provided in the end piece 35 is also illustrated.

Figure 7:
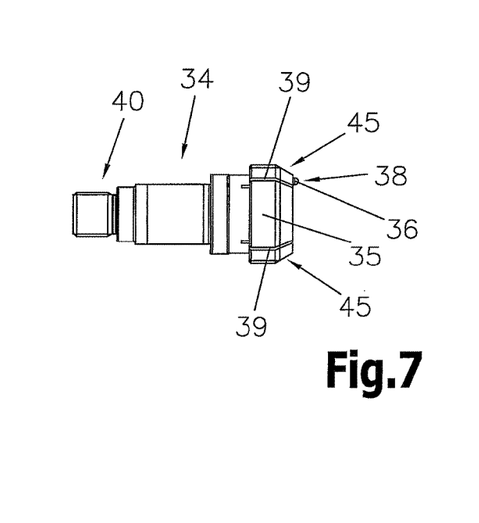
FIG. 7 a side view on the socket part according to FIGS. 2 to 4 in an unsectioned view.

FIG. 7 finally illustrates a side view on the socket part 34 according to FIGS. 2 to 4 in an unsectioned illustration. A socket part 34 of this construction is relatively simple and cost-efficient to manufacture and constitutes an optimal connection with the associated plug part 21 in the connecting device for detachably connecting a torch neck 19 of a gas-cooled welding torch 7 with a hose package and/or a torch housing.

In order to prevent that inappropriate torch necks 19 can be connected to the socket part 34 of the connecting device, it is of advantage if the dimensions of the connecting device, for instance, for gas-cooled welding torches 7 and water-cooled welding torches, are chosen differently. Thus it can be prevented that a torch neck 19 for a gas-cooled welding torch 7 is connected to a hose package for a water-cooled welding torch, and vice versa.

The invention claimed is:

1. A plug part for detachably connecting a torch neck of a gas-cooled welding torch to a socket part arranged on a hose package, said plug part having a cylindrical pipe element with a flange and an axially extending channel for a welding wire and a protective gas, and a coupling nut rotatably arranged on the pipe element, said coupling nut having an inner thread for connection to a corresponding outer thread on the socket part, wherein a bevel is disposed on the flange of the pipe element, wherein the bevel is oriented inwardly, wherein at least one receiving opening for receiving a resiliently mounted pin-like element of the socket part is arranged on the flange of the pipe element in order to fix at least one reference angular position of the torch neck, wherein the at least one receiving opening is formed by a bore, wherein the resiliently mounted pin-like element has a substantially hemispherical end,
  wherein the resiliently mounted pin-like element is adapted to deflect from the at least one receiving opening by loosening the coupling nut without opening the coupling nut completely and twisting the torch neck and
  wherein the torch neck is adapted to be fixed in a plurality of angular positions in which the resiliently mounted pin-like element does not project into any of the at least one receiving opening by tightening the coupling nut, such that the torch neck is fixable in a plurality of angular positions other than the at least one reference angular position.

2. The plug part according to claim 1, wherein the coupling nut projects over an end of the pipe element and wherein an abutment element is provided for preventing an axial shifting of the coupling nut beyond the end of the pipe element.

3. The plug part according to claim 1, wherein at least one sealing ring is arranged at the pipe element.

4. The plug part according to claim 1, wherein a sliding ring of electrically conductive material is arranged between the coupling nut and the flange of the pipe element.

5. The plug part according to claim 1, wherein the coupling nut has a diameter decreasing toward a free end of the torch neck.

6. The plug part according to claim 1, wherein the coupling nut comprises a plastic sheath.

7. A socket part for detachably connecting a hose package to a plug part arranged at a torch neck of a gas-cooled welding torch, said socket part having an at least partially cylindrically formed end piece with an axially extending channel for a welding wire and a protective gas, and an outer thread for connection to a corresponding inner thread of a coupling nut of the plug part, wherein a bevel corresponding with a bevel on the flange of a cylindrical pipe element of the plug part to be connected is disposed on the end piece, wherein the end piece comprises first and second axial cross-wise slots, wherein a pin-like element resiliently mounted in the direction of the plug part to be connected is provided, said pin-like element being adapted to be received in at least one receiving opening in the plug part in order to fix at least one reference angular position of the torch neck, wherein the pin-like element has a substantially hemispherical end,
- wherein the resiliently mounted pin-like element is adapted to deflect from the at least one receiving opening by loosening the coupling nut without opening the coupling nut completely and twisting the torch neck and
- wherein the torch neck is adapted to be fixed in a plurality of angular positions in which the resiliently mounted pin-like element does not project into any of the at least one receiving opening by tightening the coupling nut, such that the torch neck is fixable in a plurality of angular positions other than the at least one reference angular position.

8. A connecting device for detachably connecting a torch neck of a gas-cooled welding torch to a hose package, wherein the tube neck comprises a plug part according to claim 1 and the hose package comprises a socket part for detachably connecting the hose package to the plug part, said socket part having an at least partially cylindrically formed end piece with an axially extending channel for the welding wire and the protective gas, and an outer thread for connection to a corresponding inner thread of the coupling nut of the plug part, wherein a bevel corresponding with the bevel on the flange of the cylindrical pipe element of the plug part to be connected is disposed on the end piece wherein the end piece comprises at least one axial slot, wherein the socket part comprises a pin-like element resiliently mounted in the direction of the plug part, said pin-like element being adapted to be received in the at least one receiving opening in the plug part in order to fix at least one angular position of the torch neck, and wherein the pin-like element has a substantially hemispherical end.

9. The connecting device according to claim 8, wherein the plug part is connected to the torch neck.

10. The connecting device according to claim 8, wherein the socket part is connected to the end of a hose package.

11. The connecting device according to claim 8, wherein the torch neck is adapted to be rotated by 360° relative to the hose package, wherein at least one angular position of the torch neck is fixed by the at least one receiving opening in the plug part and the pin-like element in the socket part.

* * * * *